United States Patent
Bochiechio et al.

(10) Patent No.: US 12,146,419 B1
(45) Date of Patent: Nov. 19, 2024

(54) MULTI-ALLOY TURBINE ENGINE COMPONENTS AND MANUFACTURE METHODS

(71) Applicant: Raytheon Technologies Corporation, Farmington, CT (US)

(72) Inventors: Mario P. Bochiechio, Vernon, CT (US); Kevin W. Schlichting, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 804 days.

(21) Appl. No.: 17/143,669

(22) Filed: Jan. 7, 2021

Related U.S. Application Data

(60) Provisional application No. 62/958,228, filed on Jan. 7, 2020.

(51) Int. Cl.
    *F01D 5/14* (2006.01)
    *F01D 5/18* (2006.01)
    *F01D 5/28* (2006.01)

(52) U.S. Cl.
    CPC ............. *F01D 5/147* (2013.01); *F01D 5/187* (2013.01); *F01D 5/28* (2013.01); *F05D 2300/17* (2013.01); *F05D 2300/173* (2013.01)

(58) Field of Classification Search
CPC ......... F01D 5/147; F01D 5/28; F05D 2300/17
See application file for complete search history.

(56) References Cited

U.S. PATENT DOCUMENTS

| | | | | |
|---|---|---|---|---|
| 2,848,192 A | * | 8/1958 | Hayes | F01D 5/187 416/233 |
| 4,314,794 A | * | 2/1982 | Holden | F01D 5/182 416/241 B |
| 4,419,416 A | | 12/1983 | Gupta et al. | |

(Continued)

FOREIGN PATENT DOCUMENTS

| | | |
|---|---|---|
| DE | 102014206827 A1 | 10/2015 |
| EP | 3222815 A1 | 9/2017 |

(Continued)

OTHER PUBLICATIONS

Standard Test Methods for Elevated Temperature Tension Tests of Metallic Materials, May 2009, ASTM International, West Conshohocken, Pennsylvania.

(Continued)

*Primary Examiner* — Eldon T Brockman
(74) *Attorney, Agent, or Firm* — Bachman & LaPointe, P.C.

(57) ABSTRACT

A blade or vane has: an airfoil having an inner diameter (ID) end and an outer diameter (OD) end and having a suction side and a pressure side and a leading edge and a trailing edge; and an inner platform and/or attachment root at the ID end and/or an outer platform at the OD end. At least one of the inner platform, root, and/or outer platform comprises one or more pieces of a first alloy. One or more pieces of a second alloy form a leading edge section of the airfoil. One or more pieces of a third alloy form a trailing edge section of the airfoil. One or more pieces of a fourth alloy form a spar of the airfoil between the leading edge section and trailing edge section and extending into said at least one of the inner platform, root, and/or outer platform.

23 Claims, 8 Drawing Sheets

(56) References Cited

U.S. PATENT DOCUMENTS

| | | | |
|---|---|---|---|
| 7,141,812 B2 | 11/2006 | Appleby et al. | |
| 7,146,708 B2 | 12/2006 | Reiter, Jr. et al. | |
| 7,241,416 B2 | 7/2007 | Sweetland | |
| 7,648,336 B2* | 1/2010 | Cairo | F01D 9/042 29/889.21 |
| 7,780,410 B2* | 8/2010 | Kray | B23P 15/04 416/223 R |
| 8,142,163 B1* | 3/2012 | Davies | F01D 5/187 416/225 |
| 8,267,662 B2 | 9/2012 | Patrick et al. | |
| 8,444,389 B1 | 5/2013 | Jones et al. | |
| 8,496,443 B2* | 7/2013 | Campbell | F01D 5/3007 416/248 |
| 8,511,999 B1* | 8/2013 | Kimmel | F01D 5/30 416/193 A |
| 8,678,771 B2 | 3/2014 | Merrill et al. | |
| 8,813,812 B2 | 8/2014 | Kamel et al. | |
| 9,394,795 B1* | 7/2016 | Kimmel | F01D 5/147 |
| 9,687,910 B2 | 6/2017 | Bullied et al. | |
| 9,878,369 B1 | 1/2018 | Heneveld et al. | |
| 9,950,370 B2 | 4/2018 | Roth-Fagaraseanu et al. | |
| 10,207,315 B2 | 2/2019 | Appleby et al. | |
| 10,239,156 B2 | 3/2019 | Gregg et al. | |
| 10,287,896 B2 | 5/2019 | Marcin, Jr. et al. | |
| 10,422,228 B2 | 9/2019 | Castle et al. | |
| 2003/0063993 A1 | 4/2003 | Reiter, Jr. et al. | |
| 2003/0143074 A1 | 7/2003 | Tsukamoto et al. | |
| 2008/0237403 A1 | 10/2008 | Kelly et al. | |
| 2008/0310965 A1* | 12/2008 | Gerakis | F01D 5/284 416/97 R |
| 2010/0080687 A1* | 4/2010 | Vance | F01D 5/28 415/115 |
| 2014/0294652 A1 | 10/2014 | Morrison et al. | |
| 2016/0265362 A1* | 9/2016 | Slavens | B22F 3/24 |
| 2017/0022821 A1* | 1/2017 | Ferber | F01D 5/025 |
| 2019/0242260 A1* | 8/2019 | Kray | B23P 15/04 |

FOREIGN PATENT DOCUMENTS

| | | |
|---|---|---|
| EP | 3533897 A1 | 9/2019 |
| EP | 3816398 A1 | 5/2021 |

OTHER PUBLICATIONS

Standard Test Methods for Conducting Creep, Creep-Rupture, and Stress-Rupture Tests of Metallic Materials, Feb. 2015, ASTM International, West Conshohocken, Pennsylvania.

A. Wilcox et al., "Creep of Thoriated Nickel above and below 0.5 Tm", Transactions of the Metallurgical Society of AIME, Apr. 1966, pp. 570-580, vol. 236, Springer, New York, New York.

Richard S. Bellows et al., "Creep-Fatigue Behavior of Directionally Solidified and Single Crystal Intermetallic Ni3Al(B, Hf) at an Intermediate Temperature", Metallurgical Transactions A, Mar. 1988, pp. 479-486, vol. 19A Springer, New York, NY.

I. Baker et al., "Directional Annealing of Cold-Rolled Copper Single Crystals", Acta Materialia, Inc., Jan. 2002, pp. 805-813, Elsevier Science Ltd., Amsterdam, Netherlands.

M.M. Baloch et al., "Directional Recrystallization in Inconel MA 6000 Nickel Base Oxide Dispersion Strengthened Superalloy", Mar. 1990, pp. 1236-1246, Materials Science and Technology, Novelty, Ohio.

K. Mino et al., "Directional Recrystallization of an ODS MarM247-1% Y2O3 Alloy", Nov. 1984, PM Aerospace Materials, Hicksville, New York.

A.W. Godfrey et al., "The Effect of Directional Recrystallization on the Low Cycle Fatigue Response of a Powder Metallurgy Nickel-Based Superalloy at Elevated Temperatures", Materials Science and Engineering, Feb. 1997, pp. 91-100, Elsevier, Amsterdam, Netherlands.

J. Li et al., "The Effect of Hot Zone Velocity and Temperature Gradient on the Directional Recrystallization of Polycrystalline Nickel", Acta Materialia, Inc., Oct. 2002, pp. 4491-4497, Elsevier Science Ltd., Amsterdam, Netherlands.

A.O. Humphreys et al., "Effect of Process Variables on the Structure of Directionally Recrystallized MA-6000", Materials Characterization, Jan. 1995, Elsevier Science Inc., New York, New York.

R.L. Cairns et al., "Grain Growth in Dispersion Strengthened Superalloys by Moving Zone Heat Treatments", Metallurgical Transactions A, Jan. 1975, pp. 179-188, vol. 6A, Springer, New York, NY.

S. Walston et al., "Joint Development of a Fourth Generation Single Crystal Superalloy", Dec. 2004, National Aeronautics and Space Administration, Cleveland, Ohio.

Rebecca MacKay et al., "Alloy Design Challenge: Development of Low Density Superalloys for Turbine Blade Applications", Oct. 2009, National Aeronautics and Space Administration, Cleveland, Ohio.

T. Fujii et al., "A New Technique for Preparation of Molybdenum Single Crystal with an Optional Shape", Materials Letters, Feb. 1984, pp. 226-229, vol. 2, No. 3, Elsevier, Amsterdam, Netherlands.

M.A. Miodownik et al., "On the Secondary Recrystallization of Ma754", Acta Metallurgica, Inc., Apr. 1998, pp. 2809-2821, Elsevier Science Ltd., Amsterdam, Netherlands.

E.N. Da C. Andrade, "Preparation of Single Crystal Wires of Metals of High Melting Point", Jun. 1937, pp. 16-18, vol. 163, Proceedings of the Royal Society, London, United Kingdom.

M.A. Miodownik et al., "Secondary Recrystallization of Two Oxide Dispersion Strengthened Ferritic Superalloys: MA 956 and MA 957", Materials Science and Technology, Feb. 1994, pp. 102-109, Taylor & Francis, Milton, United Kingdom.

B.C. Wilson et al., The Effect of Composition, Misfit, and Heat Treatment on the Primary Creep Behavior of Single Crystal Nickel Base Superalloys PWA 1480 and PWA 1484, Superalloys-2008, May 2008, pp. 149-158, The Minerals, Metals & Material Society, Pittsburgh, Pennsylvania.

European Search Report dated Jun. 14, 2021 for European Patent Application No. 21151030.0.

Extended European Search Report dated Mar. 25, 2024 for European Patent Application No. 23220151.7.

* cited by examiner

MULTI-ALLOY TURBINE ENGINE COMPONENTS AND MANUFACTURE METHODS

CROSS-REFERENCE TO RELATED APPLICATION

Benefit is claimed of U.S. Patent Application No. 62/958,228, filed Jan. 7, 2020, and entitled "Multi-Alloy Turbine Engine Components and Manufacture Methods", the disclosure of which is incorporated by reference herein in its entirety as if set forth at length.

BACKGROUND

The disclosure relates to gas turbine engine blade and vane manufacture. More particularly, the disclosure relates to multi-material blades and vanes.

Gas turbine engines (used in propulsion and power applications and broadly inclusive of turbojets, turboprops, turbofans, turboshafts, industrial gas turbines, and the like) include blades and vanes (collectively airfoil members).

Particularly in higher temperature sections such as high pressure compressor section and turbine sections, multi-material blades have been proposed. Examples include bi- and tri-cast blades and blades formed of separately manufactured sections welded or otherwise bonded to each other.

Bi- and tri-casting methods are disclosed in U.S. Pat. No. 9,687,910, Bullied et al., Jun. 27, 2017, "Multi-shot casting".

Bonding is disclosed in U.S. Pat. No. 10,287,896, Marcin, Jr. et al., May 14, 2019, "Turbine blades and manufacture methods".

Also, various additive manufacture and laminate manufacture techniques have been developed. United States Patent Application Publication No. 2014/0294652A1, Morrison et al., Oct. 2, 2014, discloses direct metal fabrication of component greenbodies followed by assembly and sintering. U.S. Pat. No. 7,141,812 (the '812 patent) of Appleby et al., Nov. 28, 2006, "Devices, methods, and systems involving castings", and U.S. Pat. No. 10,207,315 (the '315 patent) of Appleby et al., Feb. 19, 2019, "Systems, devices, and/or methods for manufacturing castings" disclose casting methods using laminated tooling to form direct or indirect molds. Such a method is known under the trademark TOMO™ of Mikro Systems, Inc. of Charlottesville, Virginia. Individual laminations may be produced lithographically and assembled/secured." The disclosures of the '315 patent and the '812 patent are incorporated by reference in their entirety as if set forth at length.

A recent technology in sintering of powder-formed bodies is field assisted sintering technology (FAST), also known as spark plasma sintering. This involves a combination of heat, pressure, and current.

SUMMARY

One aspect of the disclosure involves an article being a blade or a vane comprising: an airfoil having an inner diameter (ID) end and an outer diameter (OD) end and having a suction side and a pressure side and a leading edge and a trailing edge; and an inner platform and/or attachment root at the ID end and/or an outer platform at the OD end. At least one of the inner platform, root, and/or outer platform comprises one or more pieces of a first alloy. One or more pieces of a second alloy form a leading edge section of the airfoil. One or more pieces of a third alloy form a trailing edge section of the airfoil. One or more pieces of a fourth alloy form a spar of the airfoil between the leading edge section and trailing edge section and extending into said at least one of the inner platform, root, and/or outer platform.

A further embodiment of any of the foregoing embodiments may additionally and/or alternatively include the article being a blade. The OD end may be a shrouded tip or a free (unshrouded) tip.

A further embodiment of any of the foregoing embodiments may additionally and/or alternatively include the article being a vane. The ID end may be at an ID platform or may be or a free (unshrouded) end.

Another aspect of the disclosure involves a blade comprising: an airfoil extending to a tip; an attachment root; and a platform between the attachment root and the tip. The platform comprises one or more pieces of a first alloy. One or more pieces of a second alloy form a leading edge section of the airfoil. One or more pieces of a third alloy form a trailing edge section of the airfoil. One or more pieces of a fourth alloy form a spar of the airfoil between the leading edge section and trailing edge section and extending into the attachment root. One or more pieces of a fifth alloy forms a tip section of the airfoil.

In a further embodiment of any of the foregoing embodiments, additionally and/or alternatively, one or more pieces of a sixth alloy form an outer portion of the root.

In a further embodiment of any of the foregoing embodiments, additionally and/or alternatively, the sixth alloy is higher strength than the second, third, fourth, and fifth alloys.

In a further embodiment of any of the foregoing embodiments, additionally and/or alternatively, the first alloy and sixth alloy are the same.

In a further embodiment of any of the foregoing embodiments, additionally and/or alternatively; the one or more pieces of the first alloy are a respective suction side piece and pressure side piece; and/or the one or more pieces of the sixth alloy are a forward suction side piece, a forward pressure side piece, an aft suction side piece, and an aft pressure side piece.

In a further embodiment of any of the foregoing embodiments, additionally and/or alternatively: the fifth alloy is less dense than the first, second, third and fourth alloys; and/or the fifth alloy is has lower strength and creep resistance than the first, second, third and fourth alloys.

In a further embodiment of any of the foregoing embodiments, additionally and/or alternatively, the fourth alloy is more creep resistant than the second and third alloys.

In a further embodiment of any of the foregoing embodiments, additionally and/or alternatively, one or more pieces of a liner alloy form a lining of passageways in the spar, the liner alloy being more corrosion resistant than the fourth alloy.

In a further embodiment of any of the foregoing embodiments, additionally and/or alternatively, the second alloy and third alloy are NiAl.

In a further embodiment of any of the foregoing embodiments, additionally and/or alternatively, the spar spans from the pressure side to the suction side.

In a further embodiment of any of the foregoing embodiments, additionally and/or alternatively, a cooling passageway system has trunks in the spar and extends into the leading edge section, trailing edge section and tip section.

In a further embodiment of any of the foregoing embodiments, additionally and/or alternatively, the cooling passageway system trunks are partially in the spar and partially in one or more adjacent root pieces.

In a further embodiment of any of the foregoing embodiments, additionally and/or alternatively, pin and socket joints span one or more mating pairs of the pieces.

In a further embodiment of any of the foregoing embodiments, additionally and/or alternatively, rail and groove joints span one or more mating pairs of the pieces.

A further embodiment of any of the foregoing embodiments may additionally and/or alternatively include a method for manufacturing the blade. The method comprises: metal injection molding (MIM) of one or more of the pieces; and sintering an assembly of the pieces.

A further embodiment of any of the foregoing embodiments may additionally and/or alternatively include the method further comprising: forming a mold for the MIM using a laminate intermediary.

A further embodiment of any of the foregoing embodiments, additionally and/or alternatively, the forming a mold for the MIM comprises: forming the laminate intermediary as a first positive of the associated piece or portion thereof; forming a first negative from the laminate intermediary; forming a second positive from the negative; and forming a MIM mold or portion thereof from the second positive.

In a further embodiment of any of the foregoing embodiments, additionally and/or alternatively, the sintering comprises: heating the assembly of the pieces; applying a load across the assembly of the pieces; and applying current across the assembly of the pieces to fuse the pieces.

Another aspect of the disclosure involves a vane comprising: an airfoil having an inner diameter (ID) end and an outer diameter (OD) end and having a suction side and a pressure side and a leading edge and a trailing edge; and an inner platform at the ID end and an outer platform at the OD end. The inner platform comprises one or more pieces of a first alloy. One or more pieces of a second alloy form a leading edge section of the airfoil. One or more pieces of a third alloy form a trailing edge section of the airfoil, One or more pieces of a fourth alloy form a spar of the airfoil between the leading edge section and trailing edge section. The outer platform comprises one or more pieces of a fifth alloy.

In a further embodiment of any of the foregoing embodiments, additionally and/or alternatively, the first and fifth alloys are the same.

In a further embodiment of any of the foregoing embodiments, additionally and/or alternatively: the first and fifth alloys are higher strength than the second and third alloys; the first and fifth alloys are less oxidation resistant than the second and third alloys; the first and fifth alloys are lighter than the fourth alloy; and/or the first and fifth alloys are less creep resistant than the fourth alloy.

In a further embodiment of any of the foregoing embodiments, additionally and/or alternatively, the fourth alloy is more creep resistant and/or less oxidation resistant than the second and third alloys.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
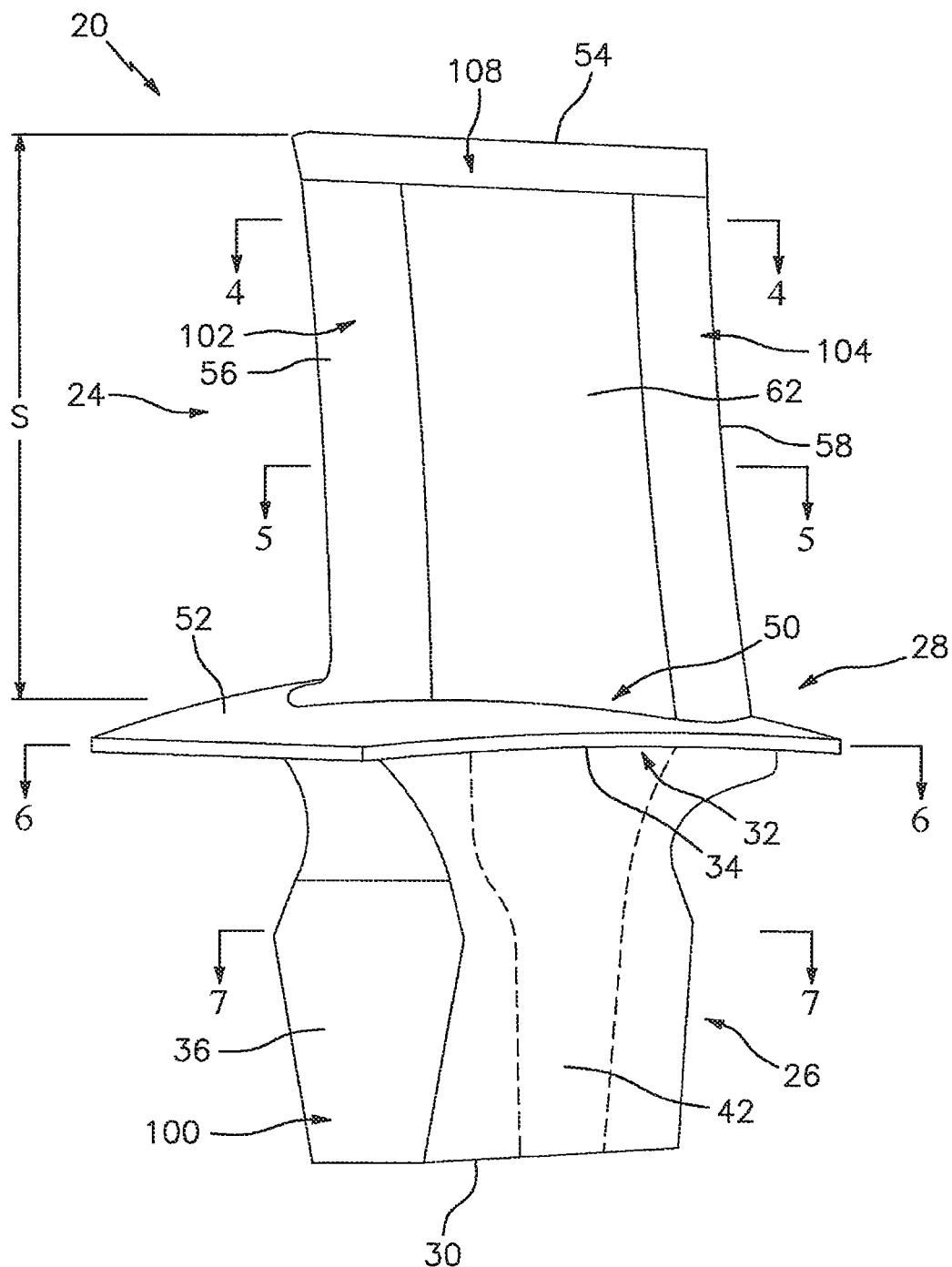
FIG. 1 is a first view of a gas turbine engine blade.
Figure 2:
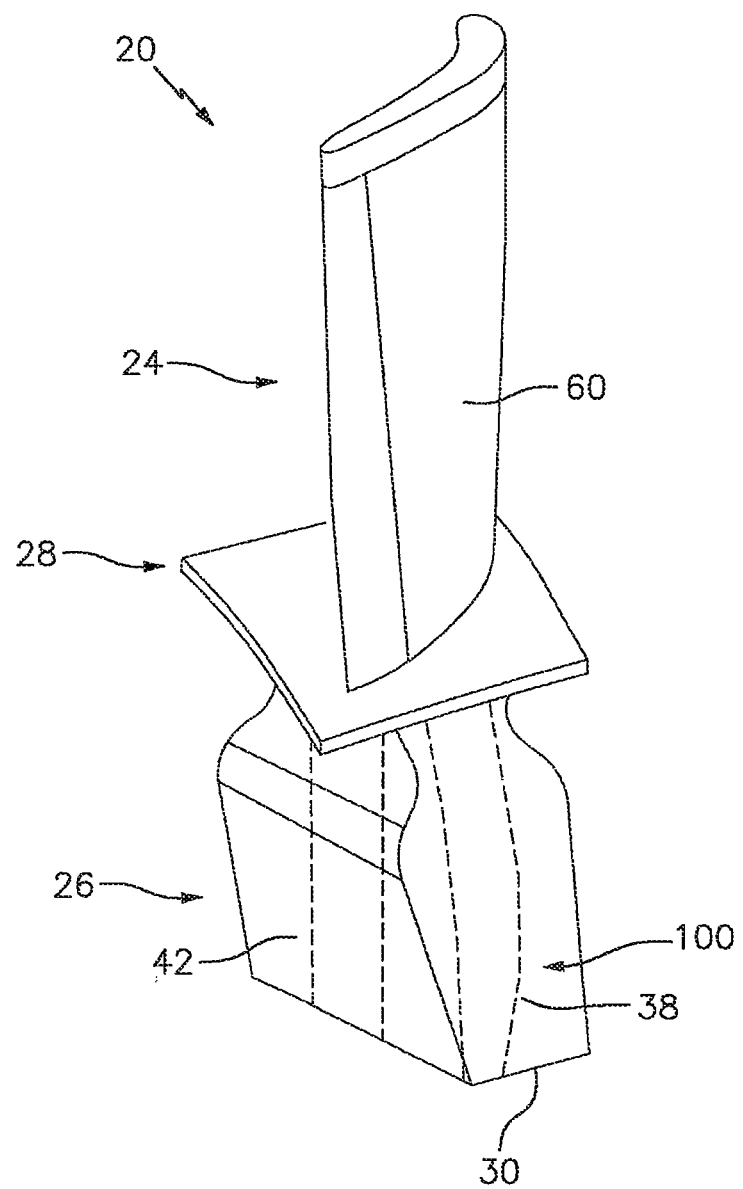
FIG. 2 is a second view of the blade.

FIG. 1 shows a blade 20 comprising a metallic substrate (e.g., nickel-based superalloy) and optionally one or more coatings (not shown—e.g., ceramic thermal barrier coatings environmental barrier coatings, bondcoats thereunder, and the like). The blade and substrate have an airfoil 24, an attachment root 26, and optionally a platform 28 at a blade-root junction. The attachment root 26 (e.g., firtree or dovetail) has: an inner diameter (ID) end 30 (relative to the centerline of the engine and disk (not shown) in which the blade mounts; an outer diameter end 32 at an underside 34 of the platform; a forward end 36; and aft end 38 (FIG. 2); a first lateral side 40 (FIG. 7); and a second lateral side 42 (FIG. 1).

The airfoil 24 (FIG. 1) has: an inner diameter (ID) proximal end 50 at the platform outer diameter (OD) gaspath surface 52; a tip 54; a leading edge 56; a trailing edge 58; a suction side 60 (FIG. 2); and a pressure side 62 (FIG. 1).

Figure 3:
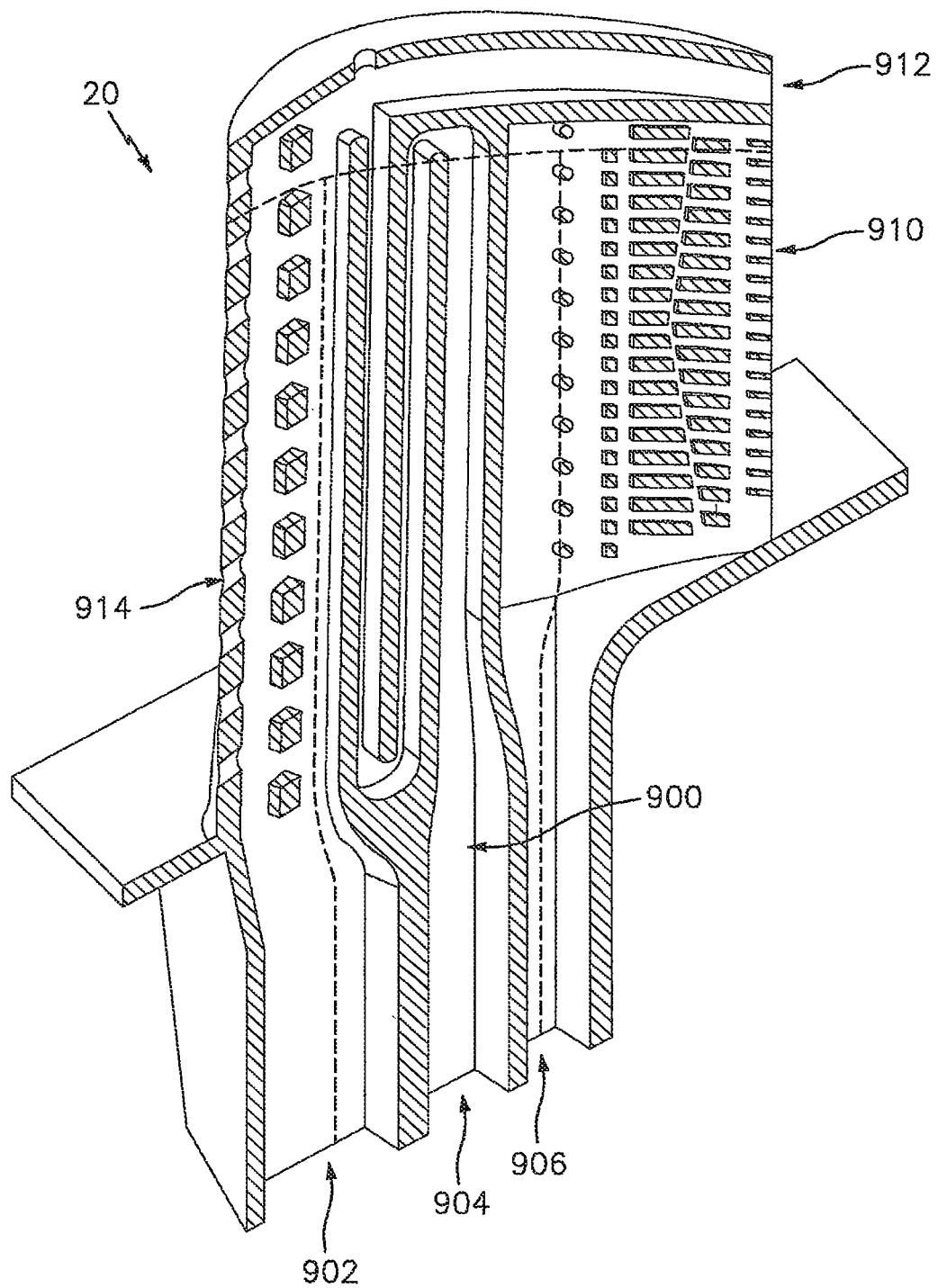
FIG. 3 is a flattened schematic cutaway view of a cooling passageway system in the blade.
Figure 4:
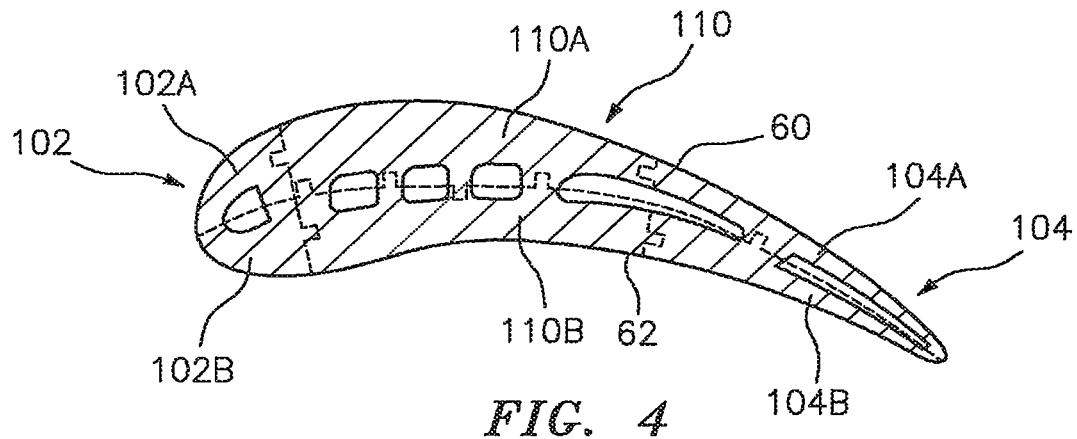
FIG. 4 is a sectional view of the blade taken along line 4-4 of FIG. 1.
Figure 5:
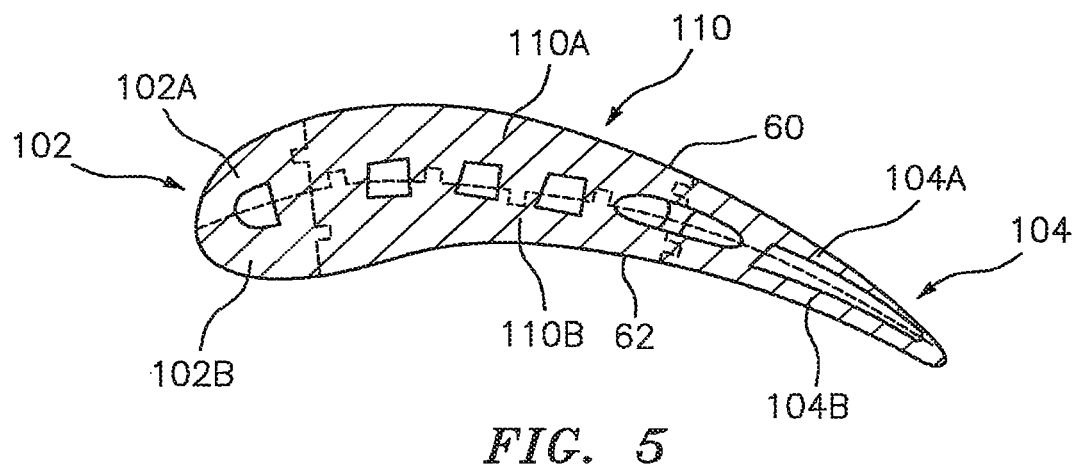
FIG. 5 is a sectional view of the blade taken along line 5-5 of FIG. 1.
Figure 6:
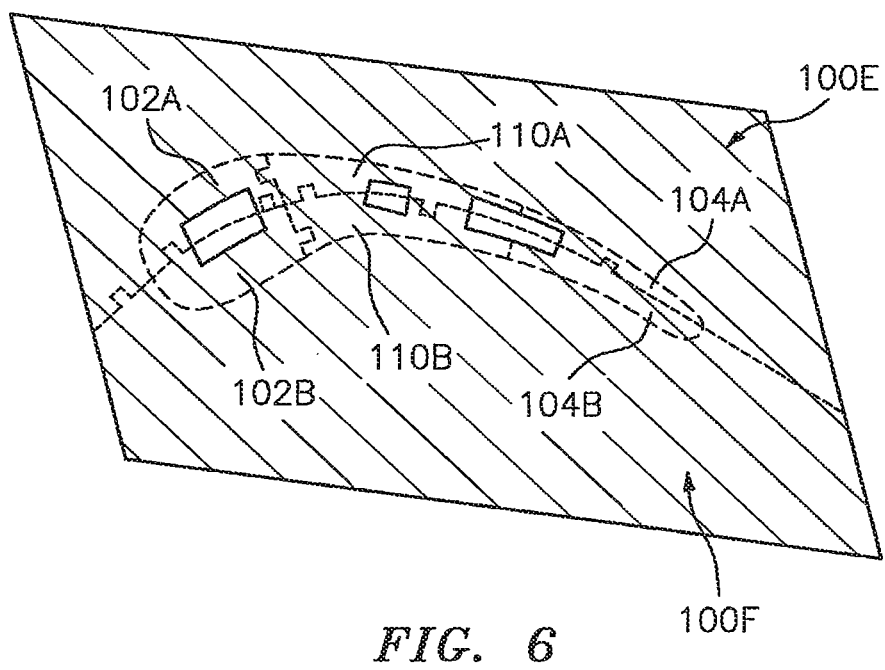
FIG. 6 is a sectional view of the blade taken along line 6-6 of FIG. 1.

The blade has an internal cooling passageway system 900 (schematically shown in flattened form in FIG. 3) extending from one or more inlets 902, 904, 906 along the root 26 ID surface 30 to one or more outlets (e.g., along the airfoil surface, tip, and/or gaspath surface of the platform such as a trailing edge slot outlet 910 (including tip flag outlet 912) and leading edge cooling holes).

As so far described, the blade may represent any of numerous known or yet-developed configurations in terms of general shape and passageway configuration. However, the blade 20 is formed in multiple sections/members/pieces of different alloys. Depending on the implementation a given section/member may be one or more pieces. Examples illustrated generally split members into multiple pieces. Surface boundaries between sections of different alloys are shown in solid line in FIG. 1. Within cross-sections (FIGS. 4-7) boundaries between the original pieces (even of a given alloy) are shown in broken lines within the cross-sectioning of the fused assembly and projecting across gaps. An exemplary first section/member 100 (root member—FIG. 1) forms most of an external contour of the root 26 (e.g., forms the firtree or dovetail). The root member 100 may also form the platform 28 or a peripheral portion thereof. In this particular example, the root/platform member 100 has multiple peripheral pieces (four shown in FIG. 7 as 100A, 100B, 100C, 100D). Generally these form respectively front pieces 100A,B (FIG. 7) of the root on the two circumferential sides and aft pieces 100C,D of the root on the two circumferential sides. In an alternative example of a six-piece configuration, the respective front pieces and aft pieces may be separated by two pieces of the platform on central portions of the respective two circumferential sides (one being to the suction side of the airfoil and one being to the pressure side).

A second section/member 102 (FIG. 4) (leading edge (LE) member) forms an airfoil leading edge along a major portion of a span S of the airfoil (e.g., in excess of 50% of the span S, more particularly, in excess of 90% and, in an example, 90-97%). The example has two pieces 102A, 102B generally to the two circumferential sides and generally one to the suction side and one to the pressure side.

A third section/member 104 (FIG. 4) (trailing edge (TE) member) forms a trailing edge portion of the airfoil of a similar local span fraction to that of the second section/member 102. The example has two pieces 104A, 104B generally to the two circumferential sides and generally one to the suction side and one to the pressure side.

A fourth section/member 108 (FIG. 8) (tip member) forms a tip cap of the airfoil accounting for the remaining airfoil span. The illustrated example is a single piece extending from leading edge to trailing edge and suction side to pressure side.

A fifth section/member 110 (FIG. 4) (spar member) form a spar that extends along the airfoil between the LE member 102 and TE member 104 but also extends radially inward through the platform into the attachment root). The example has two pieces 110A, 110B generally to the two circumferential sides and generally one to the suction side and one to the pressure side.

Materials and manufacturing techniques for the various sections/pieces (and manufacture techniques regarding assembly of the various sections/pieces) may be tailored to provide advantageous performance and for advantageous manufacturability.

In particular examples, the LE piece(s) 102 alloy may be selected for oxidation performance over the spar piece(s) 110 alloy.

In particular examples, the TE piece(s) 104 alloy may be selected for oxidation and lower density than the spar piece(s) 110 alloy.

In particular examples, the tip piece 108 alloy may be selected for light weight and environmental resistance.

In particular examples, the spar piece(s) 110 alloy may be selected for creep resistance because the spar will bear centrifugal loading. Oxidation and environmental resistance may of lower concern for the spar due to its protection/encapsulation from the high temperature environment, the spar potentially being exposed to only two internal flows of cooling air. However, where internal corrosion is a concern, the spar may have a lining (discussed below).

In particular examples, the root piece(s) 100 alloy may be selected for high strength due to high stress along attachment surfaces in addition to increased fatigue requirements associated with acceleration and deceleration of the engine. Its relative inboard position puts slightly less of premium on lightweight and its relative isolation from high forced gas exposure reduces any premium on oxidation and environmental resistance. To the extent that the root alloy extends along the platform, typically the platform may be under less aerodynamic loading than the airfoil.

Although the exemplary spar pieces extend well into the root (e.g., all the way through shown but preferably at least half way through the span of the firtree), the LE and TE pieces do not. In the exemplary embodiment they extend to inner diameter (ID) ends mating with the outer diameter (OD) surface of the piece(s) forming the platform.

Multiple variations on manufacture are possible including various degrees of preassembly of groups of pieces forming subassemblies (which may or may not coincide with members or sections) before assembling subassemblies to each other. Similarly, assembly (physical contacting of the members) may or may not coincide with the securing (bonding, sintering, and the like). The various pieces may be formed (e.g., molded) with mating surfaces (e.g., generally flat for convenience) having mating registry features (e.g., moieties such as tongue(rail)/groove or pin/socket combinations) for mating and registering with other pieces of the associated member and/or other of the members.

Several examples below use metal injection molding (MIM) to form one or more of the pieces. Particular variations involve use of the TOMO™ process to form the MIM mold tooling. For example, the TOMO™ process may form a laminate positive of the piece used to directly or indirectly cast tooling. For example, in an indirect process, the laminate positive serves as a mandrel to cast/mold an elastomeric (e.g., polyurethane or other polymeric material) negative. The elastomeric negative is used to cast/mold a ceramic positive (e.g., of alumina, silica and/or other slurry). The ceramic positive is used to cast the MIM mold tooling.

In one group of examples, there are two or more stages of sintering. A low level of sintering within an individual piece may occur as part of a debinding process after the MIM. One or more further levels of sintering may occur in assembly of pieces or subassemblies to sinter pieces or subassemblies to each other. One area of techniques for sintering is field assisted sintering technology (FAST).

Additional variations have one or more linings (not shown) formed of an alloy offering greater corrosion resistance than the alloy of the lined pieces. Although passageways may pass through all pieces, the relatively low erosion and/or corrosion resistance of the spar pieces and/or root pieces may make these particular candidates for lining even if adjacent/opposite surfaces of the passageways along the LE, TE, or tip members may not be lined. In one group of examples, this liner alloy can be created by producing thin, conforming sheet through MIM processing using TOMO™ derived tools, followed by debinding and assembly to the required member subassembly. Final sintering of the overall assembly may also sinter the lining to the associated members.

In other variations, the lining may be applied as a coating or deposition onto the internal surfaces (e.g., by PVD processing). For example, the lining may be comprised of an MCrAlY coating or a ceramic barrier coating, such as $Al_2O_3$, TiAlN, AlTiN, or combinations thereof, to specifically address ingested particulate that is corrosive to turbine alloys in more austere operating environments. This coating/deposit may be applied prior to the final joining of the two mating surfaces (e.g., mating surfaces of the spar pieces 110A, 110B). The protective coating may be applied by PVD methods such as cathodic arc or reactive chemical methods such as CVD. Exemplary coating thickness is 2.5 to 25.0 micrometers, more particularly 2.5 to 13.0 micrometers. The mating surfaces adjacent may be masked prior to application to target only the desired surfaces. Alternative linings such as those discussed above formed via MIM may be thicker and may be preformed or formed other than by coating techniques. Among candidates for such deposited liners are materials already used for corrosion resistant bondcoats. Typically, these would be rich in Cr and Al. Such high Cr, Al overlay alloys are disclosed in U.S. Pat. No. 4,419,416, Gupta et al., Dec. 6, 1983, "Overlay coatings for superalloys", the disclosure of which is incorporated by reference in its entirety as if set forth at length.

Oxidation resistance may be measured by exposing a sample to a static isothermal or cyclic furnace exposure in an oxidizing environment. The rate of oxidation is measured as weight change vs. hours of exposure (grams/hour).

Creep resistance may be measured by/as change in length at a static load with time. Commonly described as time to 0.2% plastic deformation. ASTM E139-11(2018), Standard Test Methods for Conducting Creep, Creep-Rupture, and Stress-Rupture Tests of Metallic Materials, ASTM International, West Conshohocken, PA, 2018.

Strength may be measured by/as the load required to plastically or elastically deform the alloy. Commonly described as 0.2% yield stress. Test method analysis of behavior as per ASTM E21-17e1, Standard Test Methods for Elevated Temperature Tension Tests of Metallic Materials, ASTM International, West Conshohocken, PA, 2017.

Environmental resistance may be measured by/as weight change when exposed to a corrosive sulfate-bearing medium at an elevated temperature (g/hour). Alternatively corrosion may be described as a rate of pit depth formation with time (μm/hour).

Table I below lists compositions of particular alloys. These are from single examples of nominal published data. Normal commercial compositional variations and impurity levels are expected. The identification of a particular element for one alloy does not preclude that element being present at impurity levels in another alloy even if those impurity levels are higher than in the former.

Table II below lists various candidate nickel superalloys for particular sections of the blade in specific and general examples chosen for their superior oxidative resistance and operational tolerance. Other existing or yet-developed alloys may be used having similar relative properties to those of the examples.

TABLE I

| Alloy | Alloy Composition Nominal Composition (wt %) | Density (g/cc) |
|---|---|---|
| PWA1480 | Ni(bal)—Cr(10.1)—Co(5)—W(4)—Ta(12)—Ti(1.5)—Al(5) | 8.69 |
| PWA1484 | Ni(bal)—Cr(5)—Co(10)—Al(5.6)—Ta(8.7)—W(6)—Mo(2)—Re(3)—Hf(0.1) | 8.94 |

TABLE I-continued

| Alloy | Alloy Composition Nominal Composition (wt %) | Density (g/cc) |
|---|---|---|
| PWA1487 | Ni(bal)—Cr(5)—Co(10)—Al(5.65)—Ta(8.4)—W(5.9)—Mo(1.9)—Re(3)—Hf(0.25)—Y(0.013) | 8.94 |
| TMS-138 | Ni(bal)—Cr(3.2)—Co(5.8)—Mo(2.8)—W(5.9)—Al(5.9)—Ta(5.6)—Hf(0.1)—Re(5)—Ru(2) | 8.95 |
| NiAl | Ni(68.5)—Al(31.5) | 5.86 |
| LDS1101 | Ni(bal)—Mo(7.1)—Al(6.1)—Ta(6.3)—Co(10)—Cr(5)—Re(3)—Y(0.007) | 8.5 |
| CMSX-6 | Ni(bal)—Cr(10)—Co(5)—Mo(3)—Ta(2)—Ti(4.7)—Al(4.8)—Hf(0.1) | 7.97 |
| RR2000 | Ni(bal)—Cr(10)—Co(15)—Mo(3)—Ti(4)—Al(5.5) | 7.86 |
| CMSX-10 | Ni(bal)—Cr(2)—Co(3)—Mo(0.4)—W(5)—Nb(0.1)—Ta(8)—Ti(0.2)—Al(5.7)—Hf(0.03)—Re(6) | 9.02 |
| RENE-N6 | Ni(bal)—Cr(4)—Co(12)—Mo(1)—Al(5.8)—Ta(7)—W(6)—Hf(0.2)—Re(5) | 8.97 |
| RENE-142 | Ni(bal)—C(0.12)—Cr(6.8)—Co(12)—Mo(2)—W(5)—Ta(6)—Al(6.2)—B(0.015)—Zr(0.02)—Hf(1.5)—Re(3) | 8.6 |
| RENE-195 | Ni(bal)—Cr(7.6)—Co(3.1)—Ta(5.5)—Al(7.8)—Mo(0.1)—W(3.9)—Re(1.7)—Hf(0.15) | 8.27 |
| MAR-M247 | Ni(bal)—Cr(8.4)—Co(10)—C(0.15)—Ti(1.1)—Al(5.5)—Mo(0.65)—W(10)—B(0.015)—Cb(1)—Hf(1.6) | 8.52 |
| IN-100 | Ni(bal)—Cr(9.5)—Co(15)—C(.0.17)—Ti(4.75)—Al(5.5)—Mo(3)—B(0.015)—V(1)—Zr(0.06) | 7.75 |
| IN-713 U.S. Pat. No. 2,570,193 | Ni(bal)—Cr(12.5)—Mo(4.2)—Al(6.1)—Ti(0.8)—C(0.12)—B(0.012)—Zr(0.10)—Cb + Ta(2.2) | 7.913 |
| B-1900 + Hf | Ni(bal)—Cr(8)—Co(10)—C(0.11)—Ti(1)—Al(6)—Mo(6)—B(0.015)—Hf(1.15)—Ta(4.25)—Zr(0.08) | 8.19 |
| TMS-238 | Ni(bal)—Co(6.5)—Cr(5.8)—Mo(1.1)—Re(6.4)—Ru(5)—W(4)—Al(5.9)—Ta(7.6)—Nb(0.1) | 9.0 |
| EPM-102 | Ni(bal)—Cr(2.0)—Al(5.55)—Ta(8.25)—W(6.0)—Mo(2.0)—Re(5.95)—Ru(3.0)—Co(16.5)—C(0.03)—Hf(0.15) | 9.20 |

TABLE II

Blade Section/Piece Alloys

| Example | Root and/or Platform Piece(s) | Tip Piece(s) | Spar (main) Piece(s) | Spar Lining (optional)* | LE Piece(s) | TE Piece(s) |
|---|---|---|---|---|---|---|
| Ex. 1 | PWA1480 | RENE-195 | PWA1484 |  | NiAl | NiAl |
| Ex. 2 | PWA1480 | RENE-195 | PWA1484 | High Cr, Al overlay ** | NIAl | NiAl |
| Ex. 3 | PWA1480 | RENE-195 | PWA1484 | PWA 1376 | B-1900 + Hf | B-1900 + Hf |
| Ex. 4 | PWA1480 | RENE-142 | EPM-102 | High Cr, Al overlay ** | NiAl | NiAl |
| EX 5 | PWA 1480 | IN-100 | TMS-238 | High Cr, Al overlay ** | IN-100 | IN-100 |
| EX 6 | PWA 1480 | IN-100 | TMS-238 | High Cr, Al overlay ** | Rene N5 | Rene N5 |
| Ex. 7 | PWA1480 IN-713 MAR-M247 | RENE-195 High Cr, Al overlay ** | PWA1484 PWA1487 CMSX-4+ |  | NiAl | NiAl |

*Applied by cathodic arc deposition.
** U.S. Pat. No. 4,419,416

Several different techniques may be used to manufacture the individual pieces. Candidate methods include casting, metal injection molding (MIM), and field assisted sintering technology (FAST). Lithographic/laminate techniques (e.g., TOMO™) may be used in intermediate stages of pattern or mold manufacture.

The alloys for the exemplary MIM/FAST technique can be produced through several methods. One area is gas atomization techniques, but may also include rotary atomization, and plasma rotating electrode process (PREP). Atomized powders may then be subsequently screened to an appropriate mesh size to produce the final component. One such mesh size is 325 mesh or 44 µm and finer particle size. The screened powders may then be mixed with a suitable binder or carrier for the respective manufacturing process.

The TOMO™ process for MIM tooling manufacture can produce center line parted tooling such that the seam of the sections may traverse mid span from the leading to the trailing edge. The TOMO™ process allows for the major details to be produced in a single half of the tool while the mating surface can be simplified to facilitate mating features to join the two halves together. In contrast, in conventional tooling, two evenly split halves are required to produce tooling and the inclusion of joining features such as dovetail or pin joints may require multiple inserts or slides.

Exemplary manufacture technique for the root/platform section/piece(s) 100A-F is MIM. The injection molding of alloy powder into the respective cavities may produce: respective portions of an internal platform/root cavity to accept the mating portion of the spar; and respective portions of the external geometries of the root/platform including attachment/mounting features for mating with the blade disk. Exemplary initial/precursor root attachment features may either be either of a trapezoid that may be fully machined during final processing to provide the fir tree or other shape or a near net shaped fir tree or other profile that may reduce the overall machining required. As noted above, the root pieces forming the attachment may also form the platform 28.

Figure 7:
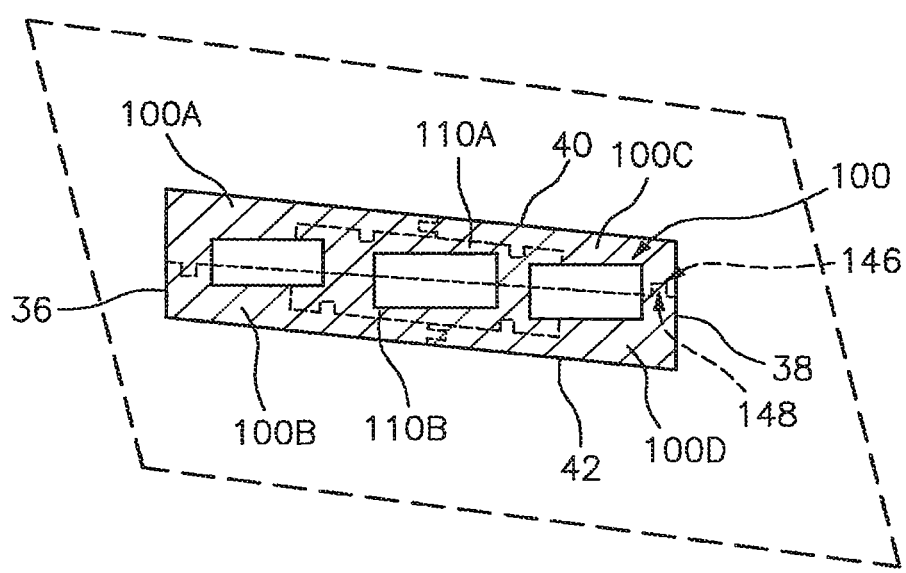
FIG. 7 is a sectional view of the blade taken along line 7-7 of FIG. 1.
Figure 8:
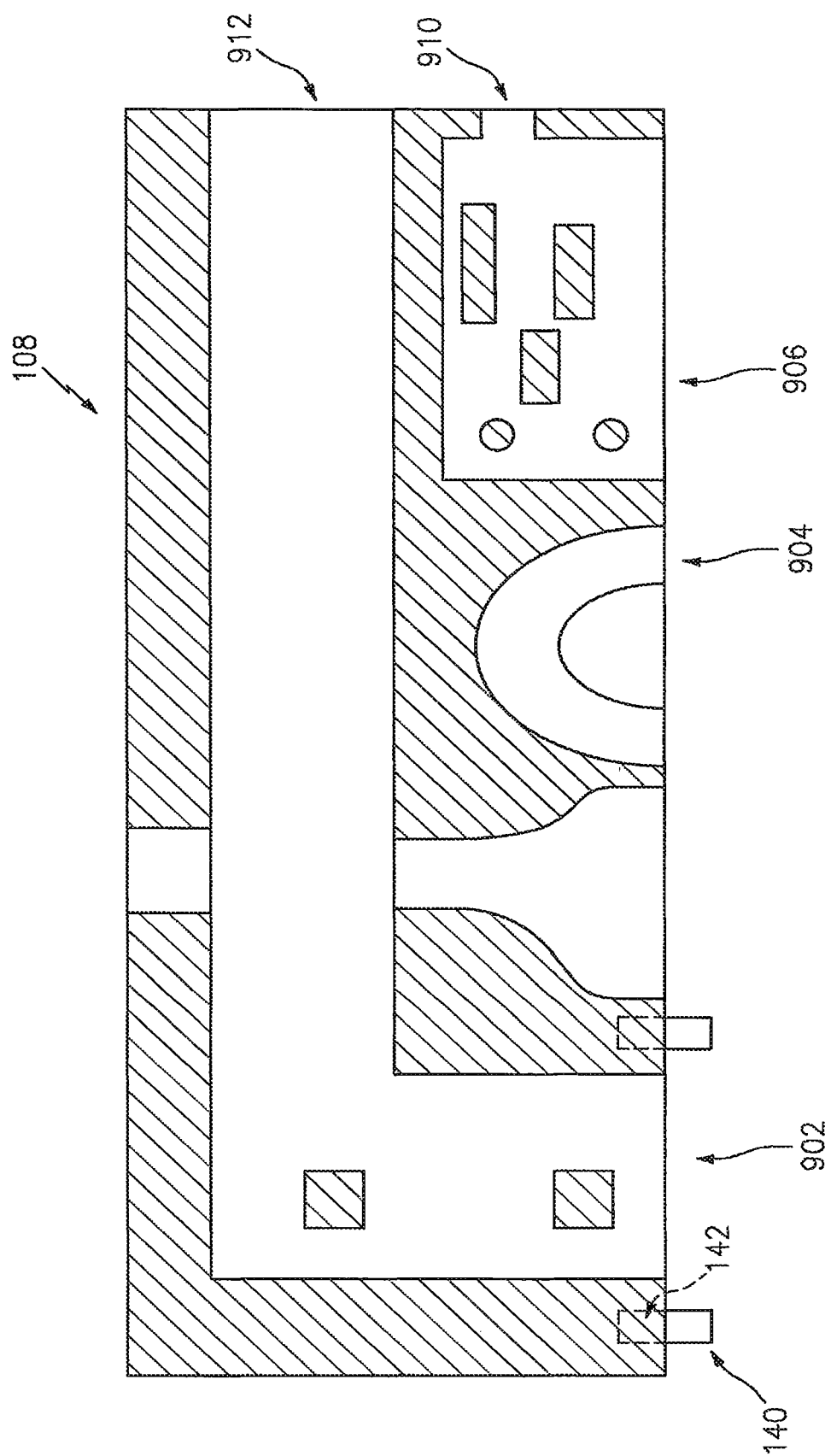
FIG. 8 is a cutaway view of a tip piece.

The tip piece(s) 108 may similarly be manufactured of an environmentally resistant alloy. Although a single tip piece is shown, there may be a similar two-piece parting as with the LE and TE members. FIG. 8 also shows pins 140 and sockets 142. Protruding pin portions may be received in complementary sockets of the associated two pieces. Or the pin may be formed unitarily with one of the mating pieces. Tongue (rail) 146 and groove 148 joints are shown in FIG. 7.

The spar pieces may be similarly manufactured. In this application a highly creep resistant alloy is desirable to maximize the peak load carrying capability of the airfoil at high temperatures. For the manufacture of the tip piece and spar the TOMO™ MIM process is desirable due to the complex parting line and internal feature geometries. The two halves of the spar may be formed with the internal cooling features and with external mating features. Such features facilitate attachment to the root sections and to the adjacent leading and trailing edges. More conventional non-TOMO™ MIM may be used for the other members.

An exemplary manufacturing technique for the LE piece 102 is TOMO™ MIM or non-TOMO™ MIM. The simpler, repeating internal shape of the LE lends itself to non-TOMO™ MIM or other process with a simpler parting line configuration and conventional tooling practices. The LE piece(s) 102 may be formed using a light weight, oxidation resistant powder such as a nickel aluminide (e.g., NiAl, CAS number 12003-78-0).

An exemplary manufacturing technique for the TE piece 104 is by TOMO™ MIM tooling and sintering processes. The trailing edge of an airfoil typically has a complex configuration of both internal heat transfer geometries and fine features and geometries to meter air out of the trailing edge discharge. This portion of the airfoil may also be made from a light weight, oxidation resistant alloy such as nickel aluminide (NiAl).

An exemplary assembly sequence and technique includes assembly of the pieces of each individual member to each other in the green state. After that subassembly process the resulting subassembly may be debound by heating in an inert (e.g., noble gas) or reducing (e.g., $H_2$, CO, and the like or combinations) atmosphere. The subassemblies, need not correspond exactly to the respective members or groups of members. A given member may be formed from portions previously subassembled in separate subassemblies. There also may be sequential subassembly steps before debinding.

Prior to assembling, the MIM pieces may be cleaned (e.g., surface-cleaning solvent such as isopropyl alcohol or acetone). For example, the spar pieces, may be assembled to each other. The leading edge member pieces may similarly be assembled to each other as may be the and trailing edge member pieces. Each of these exemplary members is individually assembled and debound. the tip member may similarly be debound. The individual root and platform pieces may be cleaned and debound. These various assembled members and separate pieces may be further assembled to form the full blade precursor and then this precursor subjected to the FAST or other sintering.

Figure 9:
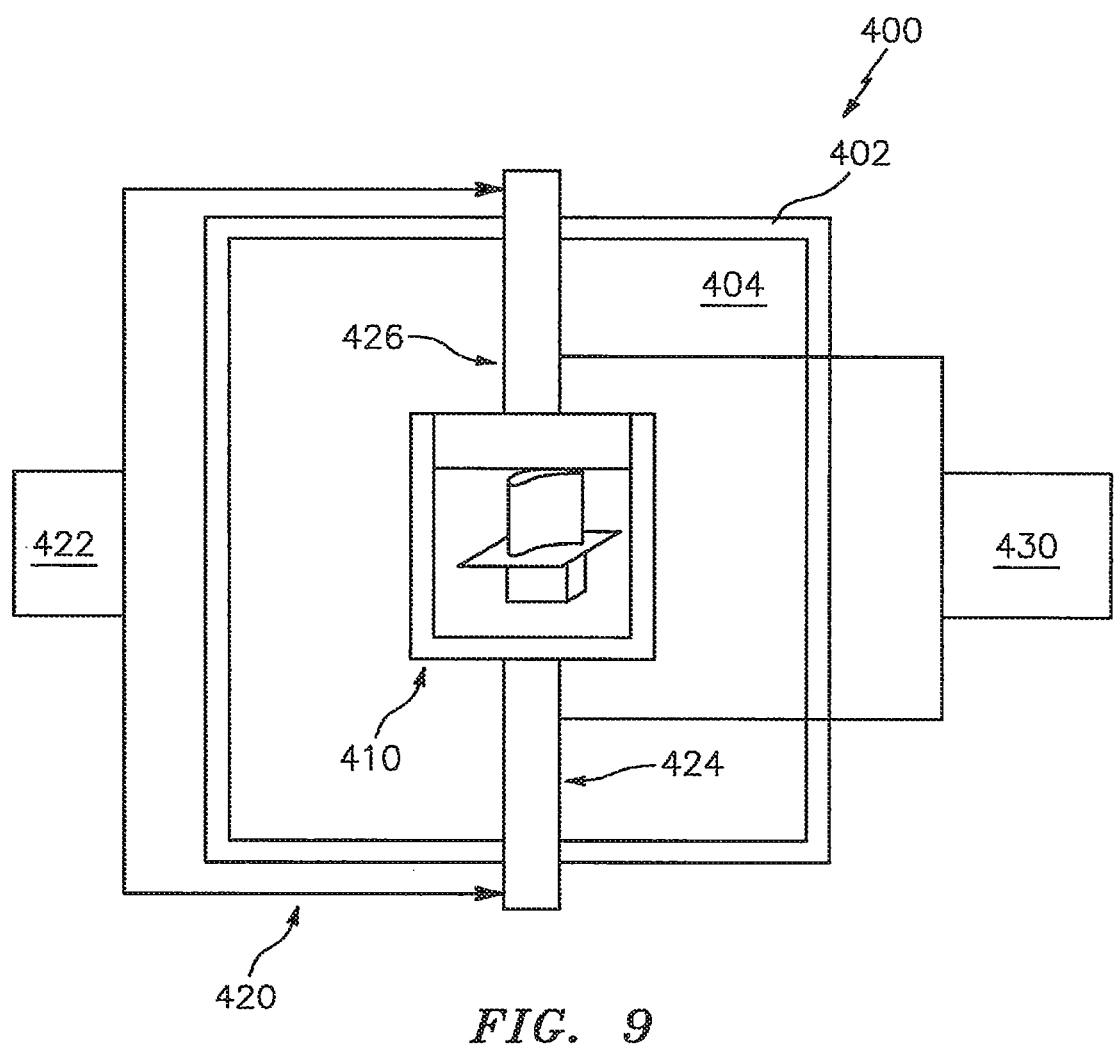
FIG. 9 is a schematic view of a field assisted sintering technology (FAST) apparatus for sintering the blade.

In the sintering, the assembly is heated to a suitably high temperature to facilitate diffusion and necking of adjacent particles. With sufficient time, the porosity in the structure may be reduced through grain growth and particle coalescence during sintering. As noted above, the sintering/joining can be completed using either conventional sintering or the FAST process (FAST apparatus 400 schematically shown in FIG. 9). Temperature for joining the segments may be sufficiently high to allow for diffusion, but not high enough to cause incipient melting of the structure. FIG. 9 shows a chamber 402 having an interior 404. The assembly is held in tooling 410 which may be coupled to a pressure source 420. The exemplary pressure source comprises a hydraulic pressure source 422 (e.g., pump) coupled to rams 424, 426 engaging respective portions of the tooling. The apparatus 400 further comprises a current source such as a high current power supply 430 coupled to the tooling to apply current across the assembly.

If required, hot isostatic pressing (HIP) can be utilized post-sintering to close up any internal porosity that was not closed during the sintering of the individual members/subassemblies (if any, either in the debinding or a separate sintering prior to the final assembly sintering) or that may otherwise exist along the parting lines of the adjacent pieces/members/subassemblies. This may be performed on the raw post-FAST or conventionally sintered assembly before machining.

After the members and their pieces are fully joined, but before machining, the assembly may then undergo directional re-crystallization by passing the assembly through a float zone furnace to control the direction of grain growth without melting the alloys. This can be accomplished using a traditional Bridgman style float zone furnace that is resistance or induction heated. This heats the completed assembly to sufficiently high temperatures to allow for the diffusion and re-ordering of the structure. To create a columnar structure within the airfoil, either no starter block or a cast columnar starter block may be used as a seed to facilitate crystal orientation. If a single crystal article is desired, a helical shaped starter block or a seed of known orientation can be utilized to convert the final article into a single crystal. Processing of the material may be conducted at temperatures above 2000° F. (1093° C.), but below the liquidus of the alloy ~2450° F. (1343° C.). In cases where it is not desirable to have the entire airfoil single crystal, the refining process can be stopped at the root section to allow the root section to remain polycrystalline.

Post crystal orientation operations, the article may undergo traditional alloy processing to optimize performance. The system may be solution heat treated at a sufficiently high temperature to allow for diffusion of species, but not high enough to cause incipient melting. This may be followed by secondary and aging heat treatments to optimize the gamma prime stricture within the alloy. As required, the heat treatment process can be modified to accommodate the application of external metallic and ceramic coatings as required by the end use application.

Figure 10:
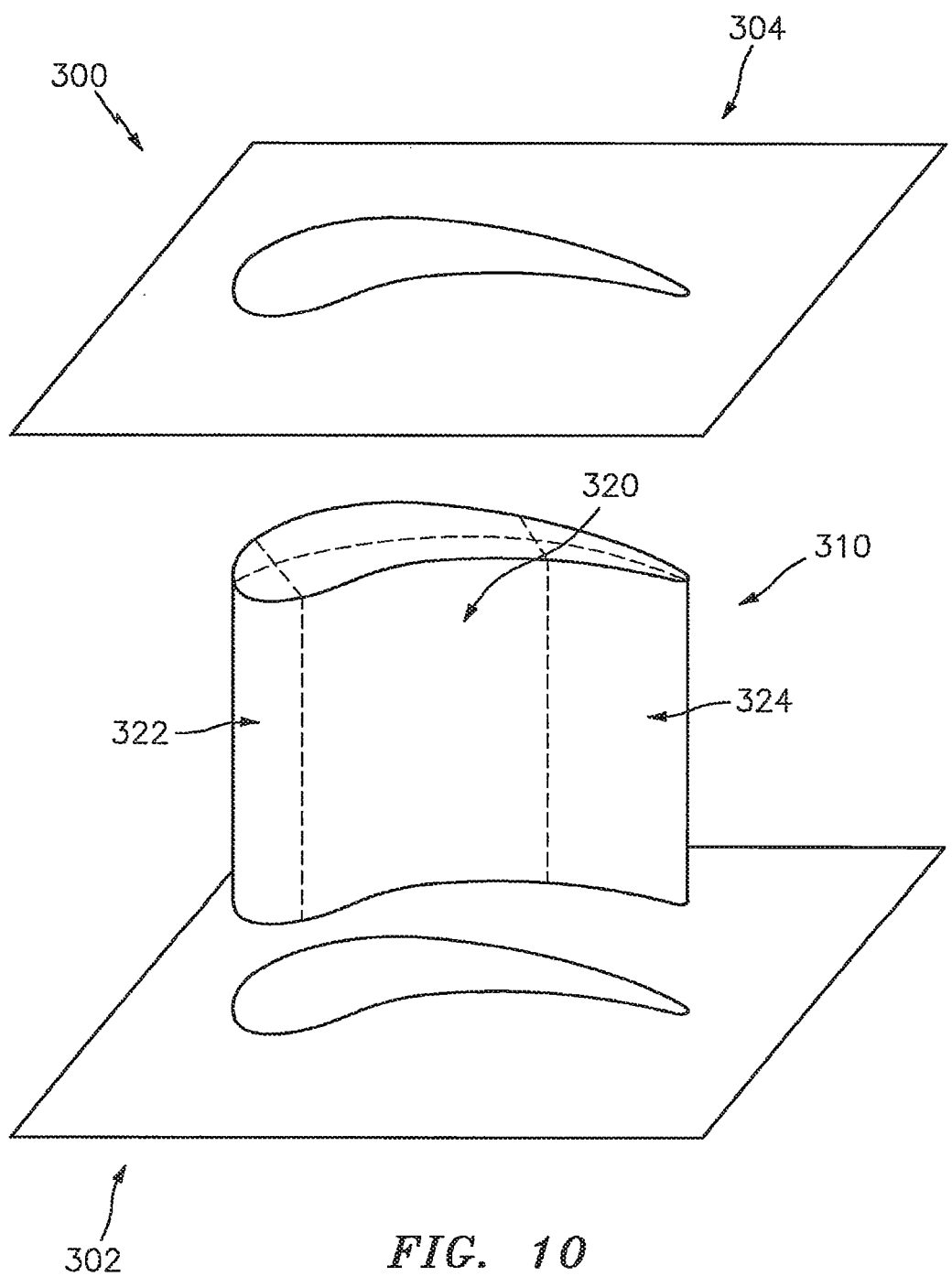
FIG. 10 is a schematic partially exploded view of a vane.

Other articles may similarly be made. For example, a vane 300 (singlet (FIG. 10) or cluster) may also be produced using conventional MIM and TOM™ MIM techniques. The inner and outer platforms (ID platform 302 and OD shroud 304) of the vane may be produced by MIM using conventional tooling. An exemplary alloy for these structures may be PWA 1480 or LDS 1101. These segments (or segment pieces) may then be debound in an inert atmosphere.

The main airfoil 310 segment(s) in one example may be produced out of three sections/members 320, 322, 324. The main spar 324 may be produced out of an alloy with creep resistance such as PWA 1484. As with the blade example, this main spar may, for example, be assembled from two pieces respectively along the suction and pressure side of the airfoil. These pieces may be produced utilizing tooling produced the TOMO™ process to accommodate the complexity of the internal cooling passages into the die and follow MIM processing to produce debound sections. The leading and trailing edge members 322, 324 may be similar to those of the exemplary blades.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A blade comprising:
   an airfoil extending to a tip;
   an attachment root; and
   a platform between the attachment root and the tip, wherein the blade comprises individual pieces:
   the platform comprises one or more said pieces of a first alloy;
   one or more said pieces of a second alloy form a leading edge section of the airfoil;
   one or more said pieces of a third alloy form a trailing edge section of the airfoil;
   one or more said pieces of a fourth alloy form a spar of the airfoil between the leading edge section and trailing edge section and extending into the attachment root; and
   one or more said pieces of a fifth alloy forms a tip section of the airfoil.

2. The blade of claim 1 wherein:
   one or more said pieces of a sixth alloy form an outer portion of the root.

3. The blade of claim 2 wherein:
   the sixth alloy is higher strength than the second, third, fourth, and fifth alloys.

4. The blade of claim 2 wherein:
   the first alloy and sixth alloy are the same.

5. The blade of claim 2 wherein:
   the one or more pieces of the first alloy are a respective suction side piece and pressure side piece; and/or
   the one or more pieces of the sixth alloy are: a forward suction side piece; a forward pressure side piece; an aft suction side piece; and an aft pressure side piece.

6. The blade of claim 1 wherein:
   the fifth alloy is less dense than the first, second, third and fourth alloys; and/or
   the fifth alloy is has lower strength and creep resistance than the first, second, third and fourth alloys.

7. The blade of claim 1 wherein:
   the fourth alloy is more creep resistant than the second and third alloys.

8. The blade of claim 1 wherein:
   one or more pieces of a liner alloy form a lining of passageways in the spar, the liner alloy being more corrosion resistant than the fourth alloy.

9. The blade of claim 1 wherein:
   the second alloy and third alloy are NiAl.

10. The blade of claim 1 wherein:
    the spar spans from the pressure side to the suction side.

11. The blade of claim 1 wherein:
    a cooling passageway system has trunks in the spar and extends into the leading edge section, trailing edge section and tip section.

12. The blade of claim 1 wherein:
    the cooling passageway system trunks are partially in the spar and partially in one or more adjacent root pieces.

13. The blade of claim 1 wherein:
    pin and socket joints span one or more mating pairs of the pieces.

14. The blade of claim 1 wherein:
    rail and groove joints span one or more mating pairs of the pieces.

15. A method for manufacturing the blade of claim 1, the method comprising:
    metal injection molding (MIM) of one or more of the pieces; and
    sintering an assembly of the pieces.

16. The method of claim 15 further comprising:
    forming a mold for the MIM using a laminate intermediary.

17. The method of claim 16 wherein the forming a mold for the MIM comprises:
    forming the laminate intermediary as a first positive of the associated piece or portion thereof;
    forming a first negative from the laminate intermediary;
    forming a second positive from the negative; and
    forming a MIM mold or portion thereof from the second positive.

18. The method of claim 15 wherein the sintering comprises:
heating the assembly of the pieces;
applying a load across the assembly of the pieces; and
applying current across the assembly of the pieces to fuse the pieces.

19. A vane comprising:
an airfoil having an inner diameter (ID) end and an outer diameter (OD) end and having a suction side and a pressure side and a leading edge and a trailing edge; and
an inner platform at the ID end and an outer platform at the OD end,
wherein the blade comprises individual pieces:
the inner platform comprises one or more said pieces of a first alloy;
one or more said pieces of a second alloy form a leading edge section of the airfoil;
one or more said pieces of a third alloy form a trailing edge section of the airfoil;
one or more said pieces of a fourth alloy form a spar of the airfoil between the leading edge section and trailing edge section; and
the outer platform comprises one or more said pieces of a fifth alloy.

20. The vane of claim 19 wherein:
the first and fifth alloys are the same.

21. The vane of claim 19 wherein:
the first and fifth alloys are higher strength than the second and third alloys;
the first and fifth alloys are less oxidation resistant than the second and third alloys;
the first and fifth alloys are lighter than the fourth alloy; and/or
the first and fifth alloys are less creep resistant than the fourth alloy.

22. The vane of claim 19 wherein:
the fourth alloy is more creep resistant and/or less oxidation resistant than the second and third alloys.

23. A blade or vane comprising:
an airfoil having an inner diameter (ID) end and an outer diameter (OD) end and having a suction side and a pressure side and a leading edge and a trailing edge; and
an inner platform and/or attachment root at the ID end and/or an outer platform at the OD end,
wherein the blade comprises individual pieces:
at least one of the inner platform, root, and/or outer platform comprises one or more said pieces of a first alloy;
one or more said pieces of a second alloy form a leading edge section of the airfoil;
one or more said pieces of a third alloy form a trailing edge section of the airfoil; and
one or more said pieces of a fourth alloy form a spar of the airfoil between the leading edge section and trailing edge section and extending into said at least one of the inner platform, root, and/or outer platform.

* * * * *